3,149,953
GRANULAR HERBICIDAL TRIAZINE COMPOSITIONS

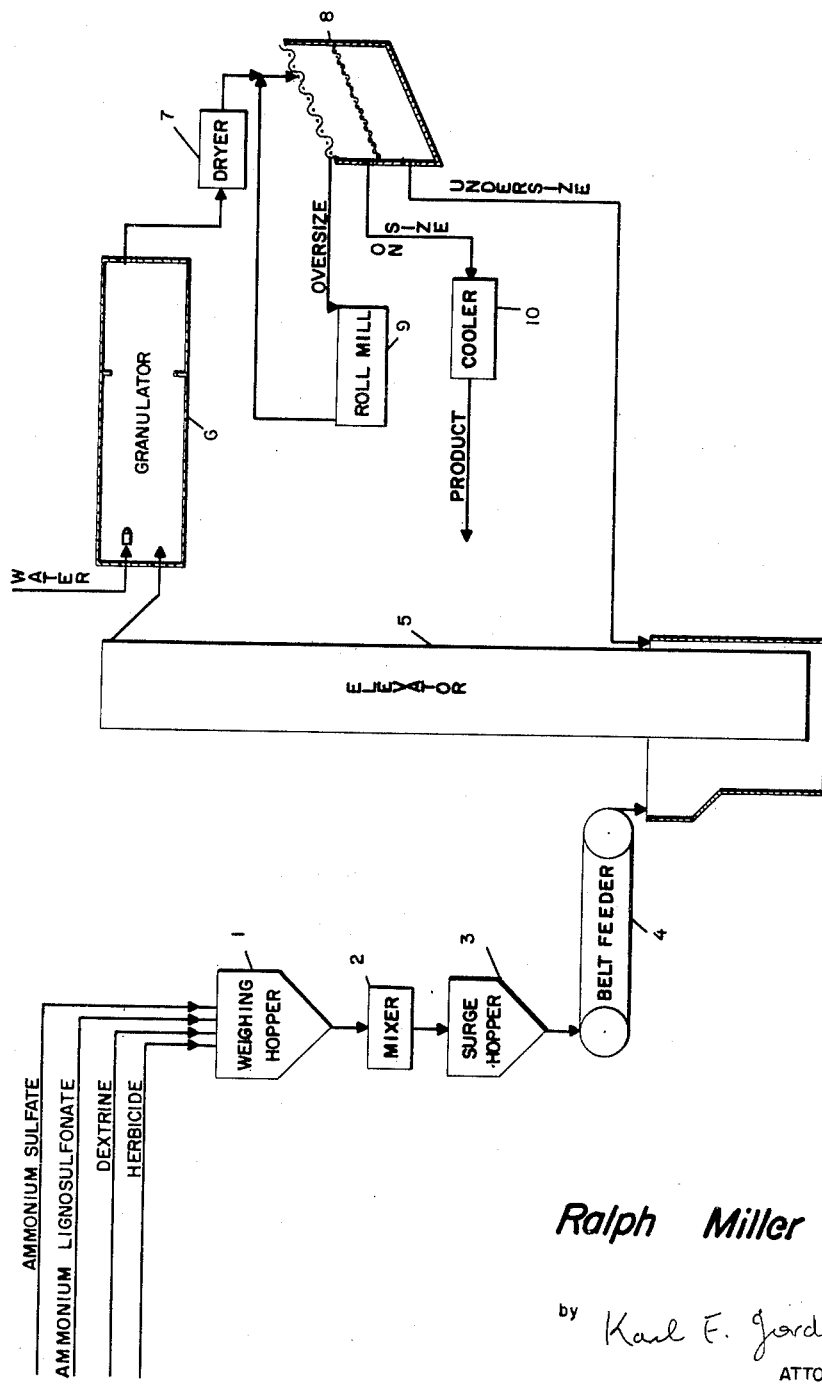

Ralph Miller, Pleasantville, N.Y., assignor to Geigy Chemical Corporation, Greenburgh, N.Y., a corporation of Delaware
Filed June 14, 1961, Ser. No. 117,072
7 Claims. (Cl. 71—2.4)

This invention relates to novel granular herbicidal compositions as well as to methods for their manufacture. More particularly, this invention pertains to concentrated, herbicidal granules whose constituents, suitably bound togther, are ammonium sulfate as diluent and growth stimulant and as active ingredient, a substantially water-insoluble, exceedingly potent solid phytotoxicant such as a triazine derivative of the following structural formula

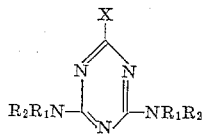

wherein $R_1$ is hydrogen, lower alkyl or lower alkenyl, $R_2$ is a lower alkyl or lower alkylalkoxy and X is halogen, lower alkoxy or lower alkylmercapto.

Notable commercial examples are such compounds as 2 - chloro - 4,6 - bis-ethylamino-s-triazine, 2 - chloro-4-isopropylamino - 6 - ethylamino-s-triazine, 2-methoxy-4, 6 - bis-ethylamino-s-triazine, 2-methoxy - 4,6 - bis-diisopropylamino-s-triazine, etc.

Herbicides of this kind are used either singly or in combination with each other or with other types of herbicidal substances as selective herbicides for weed control among cultivated plants and as overall toxic herbicides for the total elimination or inhibition of undesired plant growth or soil sterilization. (See e.g. U.S. Patents, Nos. 2,891,955 and 2,909,420.) The dosage rate employed to achieve relatively long term soil sterility is approximately five-fold the dosage rate employed to accomplish selective weed control. For example, from ten to fifteen pounds per acre of 2-chloro-4,6-bis-ethylamino-s-triazine or 2-chloro - 4 - isopropylamino - 6 - ethylamino-s-triazine are used for weed control along railroad right-of-ways, while from two to three pounds per acre of these substances are employed to control weeds in corn fields. The desired size of granules for weed control in crops is considerably smaller than that for use in soil sterilization, because of a difference in application rates and in types of applicators employed. For weed control the granules should fall within the 18 x 50 mesh (U.S. Sieve Series) range; for soil sterilization, in the 6 x 20 mesh range.

The bulk of such granular herbicidal compositions made to date have used presized attapulgite clay as carrier. Such granules have been made by what is essentially a "painting" technique. This method consists of placing the attapulgite or equivalent foraminous carrier, such as vermiculite or bentonite, in a blender along with a limited amount of the finely divided toxicant. The mixture is tumbled causing a portion of the powder to coat the surface of the granules. While the tumbling is continued, the mass is sprayed with a non-volatile liquid such as a hydrocarbon fraction in the light lubricating oil range. The oil coats the granules and is absorbed in part. The finely divided powder on the surface of the granule is anchored there by the oil. The oil also wets a portion of the unattached finely divided toxicant. These wetted particles come into contact with the carrier particles as the tumbling continues and adhere to them. The thin layer of oil on the outer surface of the granules is subsequently covered with finely divided, toxicant powder. A properly proportioned mixture of carrier granules, toxicant powder and non-volatile liquid is required. A wetting agent is frequently incorporated to aid the release of the toxicant from the granule.

Such herbicidal granules are applied by two different types of applicators. For broadcast distribution, power applicators such as cyclone seeders are frequently employed. For row crops, herbicidal compositions are frequently applied in bands to control the weeds within a span of about seven inches of either side of the row. Most band applications are made by gravity applicators consisting of a hopper with a number of adjustable bottom openings equipped with a fluted, internal rotor whose vanes almost touch the inside bottom surface of the hopper. When in motion the rotor acts as an internal agitator; when at rest as a seal to prevent the contents of the hopper from flowing out of the bottom openings.

It has been found, however, that triazine granules made by the "painting" technique possess a number of drawbacks. First, it has been impossible to make a commercially acceptable granule containing more than 8% of active ingredient. This low concentration of active ingredient makes the production as well as shipping costs excessive per pound of active ingredient.

Secondly, the hydrocarbon oil makes the solid toxicant adhere to the attapulgite clay granule or similar carrier and acts as a moisture barrier causing the active ingredient to be retained by the granule. This is true in spite of the incorporation of wetting agents. The above defined triazines tend to be quite strongly adsorbed by the soil. Attapulgite clays and similar carriers are relatively good adsorbents. Consequently, the adsorptive forces between the carrier and the active ingredient which assisted in the formation of the granule subsequently act to prevent the active ingredient from leaving the granule thereby unduly delaying or preventing the active ingredient from performing its intended function.

Thirdly, the granules made as described above lack adequate strength or hardness. Application by cyclone seeders will cause the granules to powder and dust will be formed. The rotor bar in gravity applicators subjects the granules to attrition. They powder unduly, the powder which forms tends to stick to metal surfaces and the flutes eventually become clogged, and the toxicant is then being applied at an ineffective dosage rate.

It is a principal object of the present invention to produce a herbicidal granule containing a relatively high concentration of toxicant. A further object of this invention is to prepare a herbicidal granule which permits the active ingredient to be rapidly released.

A still further object of this invention is to make a herbicidal granule of sufficient hardness capable of being distributed by a power applicator without excessive dust being formed.

An additional object is to form a herbicidal granule whose diluent or extender will increase the effectiveness of the active ingredient by serving as growth stimulant.

Another additional object of this invention is a process for the economic manufacture of concentrated herbicidal granules of any desired particle size.

Other objects and advantages of the invention will be obvious from the description hereinafter.

I have now found that it is possible to make commercially acceptable, concentrated herbicide granules of sufficient hardness containing from about 15 to about 35% by weight, and preferably about 20%, of a triazine and—unexpectedly and surprisingly—obtain with these more concentrated triazine-containing granules materially improved weed control at equal toxicant dosage rates when compared with 8% granules made on attapulgite clay carriers. Conversely, lower toxicant dosage levels are needed when using these more concentrated granules than are required when the 8% attapulgite granules are employed. For the toxicant to perform its function it must be evenly distributed over the area in which the weeds are to be controlled. It appeared to be difficult for a concentrated triazine granule to satisfy this latter requirement at the low dosage rates at which these triazines are effective herbicides because of the slight solubility of these substances in water and the ability of the soil to strongly adsorb them.

These improved results are achieved by employing ammonium sulfate as the principal constituent of the granule. It has been suggested previously that powdered ammonium sulfate be mixed with herbicides (U.S. Patent Nos. 2,472,347 and 2,498,302) so that in one operation both a herbicide and a nitrogen-containing fertilizer qua fertilizer be applied to the soil. The purpose of an application of this sort is merely to improve labor efficiency. The ratio of herbicide to fertilizer is such that the former is exceedingly small, while the latter is very high.

In the present invention, the actual weight of ammonium sulfate applied per acre is very small, e.g., when used on corn in a band treatment about 3 pounds per acre. Ammonium sulfate contains about 20% of available nitrogen. These 3 pounds of ammonium sulfate only contain about 0.6 pound of available nitrogen—a negligible amount of nitrogen for purposes of fertilization. The present invention is based on more fundamental considerations of effectiveness, economy and convenience.

According to the present invention the ammonium sulfate serves a number of purposes. First, it acts as an extender or diluent wherein a relatively small quantity of toxicant can be sub-divided uniformly among each of a large number of particles which fall within the minus 6 plus 50 mesh range or within a more narrow size range.

Secondly, the small quantity of available nitrogen does have a salutary effect on the effectiveness of the granule. The phytotoxic propensities of triazine herbicides are enhanced if the triazine reaches the weed roots when the weeds are actively growing. Even minor stimulation of plant growth causes more rapid uptake of the toxicant. Thus, the small amount of available nitrogen supplied to the weeds along with the toxicant accelerates weed growth enough to speed toxicant absorption and thereby kill the weeds more quickly and completely.

Thirdly, while triazine granules formulated with attapulgite clays tend to retain the active ingredient, by using highly soluble ammonium sulfate as the bulk of the improved concentrated granule, the triazine is completely released as soon as the first light rain or even heavy dew occurs.

Because ammonium sulfate has strong crystalline tendencies it cannot be granulated readily. Twenty percent granules of ammonium sulfate and 2-chloro-4,6-bis-ethylamino-s-triazine or 2-chloro-4-isopropylamino-6-ethylamino-s-triazine cannot be made by the ordinary techniques used to make granular fertilizer and obtain a product of adequate hardness. However, by the addition of suitable binders such as dextrin or a crude ammonium lignosulfonate which can be purchased under the trademark Orzan A, or preferably a mixture of both, granules in the desired mesh size can be made which are strong and hard enough to be successfully distributed in commercial applicators.

To obtain a substantially dust-free product of the desired size and hardness, the binder content is preferably between 4% and about 15%. Especially preferred is a binder content of about 10% to about 12.5%. The particular proportion employed depends upon the equipment used, the particle size of the ammonium sulfate and the required particle size of the product.

The following test is employed to ascertain whether an 18+50 mesh granule is adequately hard or free from sticking tendencies to be applied in a gravity applicator without the above mentioned drawbacks. The equipment consists of a pan, standard sieves, a mechanical shaker such as the Ro-Tap model manufactured by the W. S. Tyler Company, and 10 steel balls $9/16''$ in diameter.

A sample is screened to remove all the particles smaller than 50 mesh. Fifty grams of the screened material are placed in the pan along with 10 steel balls $9/16''$ in diameter. The pan and its contents are placed in the Ro-Tap shaker and shaken for thirty minutes. The pan is removed from the shaker and the appearance of the balls observed. If the balls are coated with more than a very thin layer of dust, the granules will probably clog the rotor flutes of a gravity type, rotor-equipped applicator. If the balls only contain a thin coating of dust, the balls are removed from the pan and any solids sticking to them brushed off into the pan. The contents of the pan are rescreened to determine the number of grams that are now smaller than fifty mesh in size. This number is subtracted from fifty and the result divided by fifty and multiplied by one hundred. This is called the "hardness." No difficulty would be anticipated from a granule whose hardness was in excess of about 45. To minimize difficulties in the field it is advisable that commercial granules have a hardness in excess of 60.

The ammonium lignosulfonate has dispersing as well as binding properties. In the granulation step of the processes described below the moist wet aggregates are formed more easily and a more uniform product is obtained because this binder improves the flowability of the slurry which is being subjected to agglomeration. The dispersing action of ammonium lignosulfonate also aids in the distribution of the toxicant after the granule is applied. As a result of rain or dew the ammonium sulfate and the binding substance go into solution to form a droplet of slurry with the insoluble herbicide. The presence of the ammonium lignosulfonate diminishes the clumping tendency of the solid herbicide particles in the droplet. This spreads them over a larger area than they would cover if the ammonium lignosulfonate were absent. In this way the binder improves the secondary distribution of the toxicant contained in each granule.

In general, the granular compositions of this invention can be manufactured by a series of coordinated unit operations involving the steps of mixing ammonium sulfate whose particle size is less than that of the final product or which falls into the desired particle size of the final product, with the desired weight of active ingredient and a solution of the binder under such conditions as to cause the bulk of the heterogeneous mixture to form moist aggregates which are at least as large as the minimum size desired particle and contain the active ingredient in the required proportion, drying the moist aggregates to form solid granules, and screening the output of the drying operation to obtain the fraction falling within the desired particle size range. Formulations may be varied within certain limits to obtain compositions that can be converted into solid particles of suitable size, hardness and flowability.

These improved herbicidal granular compositions can be made by any one of a variety of techniques as illustrated by the following examples. Parts are given by weight.

EXAMPLE 1

One method that has been successfully used for small scale production of this granular product employs a twin-shell, vacuum dryer equipped with an internal agitator, heating jacket, means for spraying a solution into the interior while the dryer is rotating and the agitator is in motion, plus a vapor outlet connected to a condenser and vacuum source. This unit is charged with 76 parts of finely divided ammonium sulfate and 20 parts of powdered 2-chloro-4,6-bis-ethylamino-s-triazine. The mixture is agitated by rotating the dryer and internal agitator. While continuing the vigorous agitation 4 parts of dextrin dissolved in about 6 parts of water are pumped into the interior of the dryer. The operation of the internal agitator is continued for an additional two to five minutes after all the dextrin solution has been pumped into the dryer. The internal agitator is then stopped and the blender rotation continued. The vapor outlet line to the condenser and vacuum source is opened and low pressure steam passed into the jacket so that the water in the mix is evaporated while the tumbling within the dryer is continued. When all of the water is evaporated and the dryer opened it is found that the mixture is converted into small, firm, free-flowing, dust-free granules.

Table I shows the particle size analysis of the product:

*Table I*

GRANULES CONTAINING 2-CHLORO - 4,6 - BIS-ETHYL-AMINO-s-TRIAZINE MADE IN TWIN-SHELL VACUUM DRYER

| Mesh size: | Percent by weight |
|---|---|
| +20 | 2.3 |
| −20+30 | 21.9 |
| −30+40 | 23.5 |
| −40+60 | 52.3 |

EXAMPLE 2

A method that is more adapted to large scale production requires hoppers for each constituent, weight feeders, belt conveyors, a paddle mixer, a roto-louvre dryer, a roll mill and a set of vibrating screens. The binder is composed of equal parts of dextrin and ammonium lignosulfonate dissolved in sufficient water to form a solution containing 50% of dissolved solids.

The solid constituents of the formulation are continuously fed to the feed end of the paddle mixer so that 70 parts of finely divided ammonium sulfate enter the process for each 20 parts of solid 2-chloro-4-isopropylamino-6-ethylamino-s-triazine. In addition, about 30 parts of solid recycle are also fed to the paddle mixer. At a point about one-fourth of the distance from the inlet to the exit of the paddle mixer, the solution of dextrin and Orzan A is sprayed onto the mixed solids moving through the paddle mixer. For every 20 parts of 2-chloro-4-isopropylamino-6-ethylamino-s-triazine fed to the process 5 parts of dextrin and 5 parts of ammonium lignosulfonate are added along with the water in which they are dissolved. At about the same point water is sprayed onto the mixture so that the moisture content of the output of the paddle mixer is maintained in the range 8 to 11. The output of the paddle mixer is carried by a belt conveyor to the roto-louvre dryer. The product of the dryer consists of hard, rounded particles of varying size. The resulting particle size distribution is quite sensitive to the total moisture input. The larger the moisture input, the larger the average particle size. By careful moisture control it is possible to obtain from 20% to 25% of 18 x 50 mesh particles, from 5% to 10% of minus 50 mesh fines, with the balance plus 18 mesh material. About 65% of the plus 18 mesh material can be converted to 18 x 50 mesh product by passing the oversize through the roll mill. The minus 50 mesh fines are recycled to the paddle mixer step. By moisture adjustment and roll mill setting, it is possible to obtain a yield of 50% to 60% of particles in the minus 8 plus 18 mesh range. The undersized particles can be recycled.

EXAMPLE 3

Good quality granules can also be obtained by a modification of the above process. This modified process constitutes a presently preferred embodiment and is illustrated diagrammatically by the attached flow chart. The solid ingredients of the formulation enter the process via a weighing hopper 1. In this variation of the process it is advisable to employ a total binder content of about 12.5%–5% ammonium lignosulfonate and 7.5% dextrin. The herbicide content can be from about 15% to 35% and is preferably 20%. The balance is ammonium sulfate. The solids in the correct proportions are thoroughly blended together in any suitable mixer such as a ribbon mixer 2 or conical blender. The resulting mix is discharged to a surge hopper 3. The blend is taken from the surge hopper at a controlled rate by a belt feeder 4 which empties into an elevator 5 which also receives recycle of undersize particles as mentioned below. The elevator discharges to a granulator 6 which is essentially a rotating cylinder with a dam at about its mid-point. The feed side of the dam is equipped with a scraper to prevent material from sticking to and building up on the inner surface of the cylinder and a manifold through which water or solution can be sprayed onto the finely divided solids. Usually water is sprayed onto the solids to form a moist mix containing about 10% water. The water dissolves the binder constituents forming a sticky solution capable of wetting the herbicide and the ammonium sulfate. As a result of the repetitive rolling contact induced by the solids tumbling over each other and the sticky coating on the particles, the finely divided solids are formed into moist agglomerates. The dam retains the solids in the feed end of the granulator long enough to allow the bulk of the agglomerates to grow at least as large as the minimum desired size.

After the particles flow over the dam, they pass through the remainder of the granulator quite rapidly although the time is sufficient to allow the liquid phase to diffuse uniformly throughout the agglomerate. Relatively little particle to particle contact takes place on the discharge side of the dam. The rolling action during the passage from the dam to the granulator outlet increases the particles' spherodicity and their strength. After leaving the granulator, the firmed, moist particles fall into a chute leading to a co-current, direct-fired, flight-equipped, rotary dryer 7. As the granules travel through the dryer, the water they contain is evaporated. The solution from which the water evaporates becomes increasingly viscous and sticky as the solid concentration builds up. The removal of the last few percent of water leaves the binder constituents behind in the form of adherent films between the powdered herbicide and ammonium sulfate. This is the cementing action that provides the particle with the desired strength.

The solids reach a temperature of 190–230° F. when they emerge from the dryer. The moisture content is reduced below .5%. The output of this step consists of hard granules of various sizes. These are sized over a set of vibrating screens 8. When making 18 x 50 mesh particles the set of screens consists of an upper screen with 18 mesh openings and a lower screen with 50 mesh openings. The material which does not pass through the 18 mesh openings is put through a roll mill 9 to break the oversized particles down. From 55% to 70% of these oversized particles are converted to material of the right size (onsize). The remainder are undersized particles. The output of the roll mill is recycled to the screens. The undersized particles leaving the dryer or formed by the roll mill pass through the 50 mesh openings in the lower screen and are recycled to the agglomeration step by way of the elevator conveyor 5. The onsize material is passed to a cooler 10. The cooler is similar in construction to the dryer. Air is drawn into it at the discharge end by an exhaust fan connected to the inlet end of the cooler by appropriate duct work. The temperature of the onsize granules is reduced to about 90°–100° F. or lower by their passage through the dryer counter-current to the flow of cooling air. The cooled, onsize product may be packaged directly or given a second screening by screens not shown to remove any dust formed in the cooler. The separated dust is recovered and recycled to the process.

If an 8 x 18 mesh product is needed for soil sterilant use, appropriate changes are made in the size of the screens used for sizing and the opening in the roll mill is adjusted to make a larger product.

Twenty percent triazine granules made as described above were field tested and compared with 8% granules made on an inert, adsorptive carrier such as attapulgite clay. In this test 8 x 18 mesh 20% granules of 2-chloro-4-isopropylamino-6-ethylamino-s-triazine were compared with 15 x 30 mesh 8% granules containing this herbicide and made on appropriately sized attapulgite clay. These two types of granules were applied to plots containing a variety of weeds at dosage rates of 10, 12.5 and 15 pounds of active ingredient per acre. The application was made in the spring with the weeds just starting to grow vigorously. Rain fell soon after the application and at frequent intervals during the ensuing two month period. It was found that at the 10 pound active ingredient rate using 20% ammonium sulfate granules, the weed control achieved was equivalent to that obtained at the 12.5 pound active ingredient rate using 8% clay granules.

Thus, to obtain comparable weed control with each granule, about 1.25 pounds of the herbicide as the 8% granule are required for each pound of herbicide present in the ammonium sulfate granule. This approximate 25% improvement in efficiency is ascribed in part to weed growth stimulation provided by the available nitrogen of the ammonium sulfate and in part to the more rapid and more complete release of the toxicant.

The 20% granules release the toxicant more quickly than those made with an attapulgite type carrier. This difference in release rate was manifestly demonstrated during a field trial carried out on a sloping corn field. Several days after the corn had been planted and the granules applied, there was a heavy rain. The rain was sufficiently heavy to cause some of the surface soil to be moved downhill. The two types of granules were being tested in adjoining rows in band treatments 14 inches wide. In the row with the 20% granules weed control was excellent in the 14" swath. In the row with the 8% clay granules chlorosis developed in weeds in a swath considerably wider than 14". The displacement was in the downhill direction. There was no doubt that some of the attapulgite granules had been displaced downhill and sufficient herbicide was still attached to the granule so that continued weathering had released sufficient additional herbicide to kill weeds in the vicinity of the shifted granules.

What is claimed is:
1. A dry, granular, substantially dust-free herbicidal composition of a hardness in excess of about 45 and adapted to release the active ingredient rapidly comprising as a highly water-soluble diluent ammonium sulfate having intimately and uniformly incorporated therein as an active ingredient from about 15% to about 35% by weight of a substantially water insoluble trizaine derivative of the formula

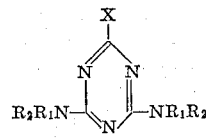

wherein
$R_1$ is selected from the group consisting of hydrogen, lower alkyl and lower alkenyl,
$R_2$ is a member of the group consisting of lower alkyl and lower alkylalkoxy and
X is taken from the group consisting of halogen, lower alkoxy and lower alkylmercapto,
said diluent and active ingredient being suitably bound together by about 4% to about 15% by weight of a highly water-soluble mixture of dextrin and ammonium lignosulfonate, said granular composition being made by mixing its ingredients under agitation and in the presence of water to form moist agglomerates, drying said agglomerates and recovering the granules within the range of about 6 x 50 mesh U.S. sieve series.

2. A dry, granular, substantially dust-free herbicidal composition of a hardness in excess of about 60 and adapted to release the active ingredient rapidly comprising as a highly water-soluble diluent ammonium sulfate having intimately and uniformly incorporated therein as an active ingredient about 20% by weight of a substantially water-insoluble triazine derivative of the formula

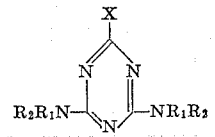

wherein
$R_1$ is selected from the group consisting of hydrogen, lower alkyl and lower alkenyl,
$R_2$ is a member of the group consisting of lower alkyl and lower alkylalkoxy and
X is taken from the group consisting of halogen, lower alkoxy and lower alkylmercapto,
said diluent and active ingredient being suitably bound together by about 10% to about 12.5% by weight of a highly water-soluble mixture of dextrin and ammonium lignosulfonate, said granular composition being made by mixing its ingredients under agitation and in the presence of water to form moist agglomerates, drying said agglomerates and recovering the granules within the range of about 6 x 50 mesh U.S. sieve series.

3. A herbicidal composition as defined in claim 2, wherein the binder and dispersant is a mixture of 7.5 parts of dextrin and 5 parts of ammonium lignosulfonate.

4. A herbicidal composition as defined in claim 2, wherein the size of the granules is within the range of about 18 x 50 mesh U.S. sieve series.

5. A herbicidal composition as defined in claim 2, wherein the size of the granules is within the range of about 6 x 20 mesh U.S. sieve series.

6. A herbicidal composition as defined in claim 2, wherein the triazine derivative is 2-chloro-4,6-bis-ethylamino-s-triazine.

7. A herbicidal composition as defined in claim 2, wherein the triazine derivative is 2-chloro-4-isopropylamino-6-ethylamino-s-triazine.

References Cited in the file of this patent

UNITED STATES PATENTS

| | | |
|---|---|---|
| 2,472,347 | Sexton | June 7, 1949 |
| 2,498,302 | Sexton | Feb. 21, 1950 |
| 2,792,295 | Wright | May 14, 1957 |
| 2,858,250 | Geary | Oct. 28, 1958 |
| 2,992,090 | Littler | July 11, 1961 |
| 3,022,150 | Weed | Feb. 20, 1962 |

FOREIGN PATENTS

| | | |
|---|---|---|
| 123,579 | Australia | Feb. 27, 1947 |
| 589,926 | Canada | Dec. 29, 1959 |
| 609,137 | Great Britain | Sept. 27, 1948 |